United States Patent
Doyle et al.

(10) Patent No.: US 6,766,769 B1
(45) Date of Patent: Jul. 27, 2004

(54) PET TRANSPORTER FOR A BICYCLE

(76) Inventors: Thomas P. Doyle, 1667 Charleston Ct., Melrose Park, IL (US) 60160; Michelle J. Charles, 1667 Charleston Ct., Melrose Park, IL (US) 60160

( * ) Notice: Subject to any disclaimer, the term of this patent is extended or adjusted under 35 U.S.C. 154(b) by 0 days.

(21) Appl. No.: 10/656,814

(22) Filed: Sep. 8, 2003

(51) Int. Cl.[7] .............................................. A61K 01/00
(52) U.S. Cl. ..................... 119/496; 296/24.31; 280/204
(58) Field of Search .................................. 119/497, 496, 119/453, 400, 771; 296/24.31, 180; 280/204, 292, 494, 496, 498; 446/451

(56) References Cited

U.S. PATENT DOCUMENTS

| | | | |
|---|---|---|---|
| 715,927 A | * 12/1902 | Youngblood ................. | 52/143 |
| 1,251,866 A | 1/1918 | Gordaro | |
| 2,897,781 A | 8/1959 | Olson | |
| 3,574,388 A | * 4/1971 | Stone ......................... | 296/168 |
| 3,865,425 A | 2/1975 | French | |
| D248,054 S | 5/1978 | Harrod | |
| 5,054,800 A | * 10/1991 | Christensen et al. ........ | 280/204 |
| 5,113,793 A | 5/1992 | Leader et al. | |
| 5,330,217 A | * 7/1994 | McCarthy ................... | 280/204 |
| 5,421,597 A | * 6/1995 | Berner ........................ | 280/204 |
| 5,447,354 A | * 9/1995 | Delp ........................... | 296/104 |
| 5,460,395 A | 10/1995 | Chen | |
| 5,467,734 A | * 11/1995 | Ho .............................. | 119/497 |
| 5,577,646 A | 11/1996 | White | |
| 5,641,173 A | 6/1997 | Cobb, Jr. | |
| 5,701,843 A | 12/1997 | Lazides | |
| 5,832,874 A | 11/1998 | Ravin | |
| 6,296,297 B1 | * 10/2001 | Barrow et al. .............. | 296/173 |
| 6,374,775 B1 | * 4/2002 | Baumsteiger ............... | 119/496 |
| 6,446,981 B1 | * 9/2002 | Wise et al. ................. | 280/7.17 |
| 6,571,740 B1 | * 6/2003 | Kinder et al. ............... | 119/497 |

* cited by examiner

*Primary Examiner*—Charles T. Jordan
*Assistant Examiner*—John W. Zerr

(57) ABSTRACT

A pet transporter for a bicycle includes a housing having a top wall, a bottom wall and a peripheral wall. At least one door is positioned in the peripheral wall. A wheel assembly includes a pair of axles each having a pair of wheels attached thereto. A coupler assembly releasably couples the wheel assembly to the bottom wall of the housing. An elongated member has a first end a second end. A pivot member releasably couples the first end to a front wall of the housing such that the first end if pivotally coupled to the housing. A securing member is attached to the second end of the elongated member for releasably coupling the second end to a bicycle chair mount.

7 Claims, 5 Drawing Sheets

PET TRANSPORTER FOR A BICYCLE

BACKGROUND OF THE INVENTION

1. Field of the Invention

The present invention relates to pet transporter devices and more particularly pertains to a new pet transporter device for PURPOSE.

2. Description of the Prior Art

The use of pet transporter devices is known in the prior art. U.S. Pat. No. 3,865,425 describes a pet trailer that is capable of being towed by vehicles. Another type of pet transporter device is U.S. Pat. No. 5,577,646 which is essentially a compartment for holding a pet which is mountable on a bicycle. Yet another pet transporter is U.S. Pat. No. 5,832,874 which includes a pet carrier that is mountable to a tandem bicycle.

While these devices fulfill their respective, particular objectives and requirements, the need remains for a device that allows a person to tow their pet behind their bicycle using a device which may also be used for other conventional pet transportation needs. This should include the ability to add or remove wheels and tow bar as needed. Additionally, the device should be easily removable from a bicycle and should be easily storable.

SUMMARY OF THE INVENTION

The present invention meets the needs presented above by generally comprising a housing having a top wall, a bottom wall and a peripheral wall extending between and being attached to the top and bottom walls. The peripheral wall includes a front wall, a back wall, and a pair of side walls. At least one door is positioned in the peripheral wall for selectively accessing an interior of the housing. A wheel assembly includes a central member. Each of a pair of axles is attached to the central member such that the axles are orientated perpendicular to the central member and the central member substantially divides the axles. Each of the axles has a pair of free ends. A plurality of wheels is each rotatably mounted on the axles such that each of the axles includes at least one wheel positioned adjacent to each of the free ends. A coupler assembly releasably couples the wheel assembly to the bottom wall of the housing. An elongated member has a first end a second end. A pivot member releasably couples the first end to the front wall such that the first end if pivotally coupled to the housing. A securing member is attached to the second end of the elongated member for releasably coupling the second end to a bicycle chair mount.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
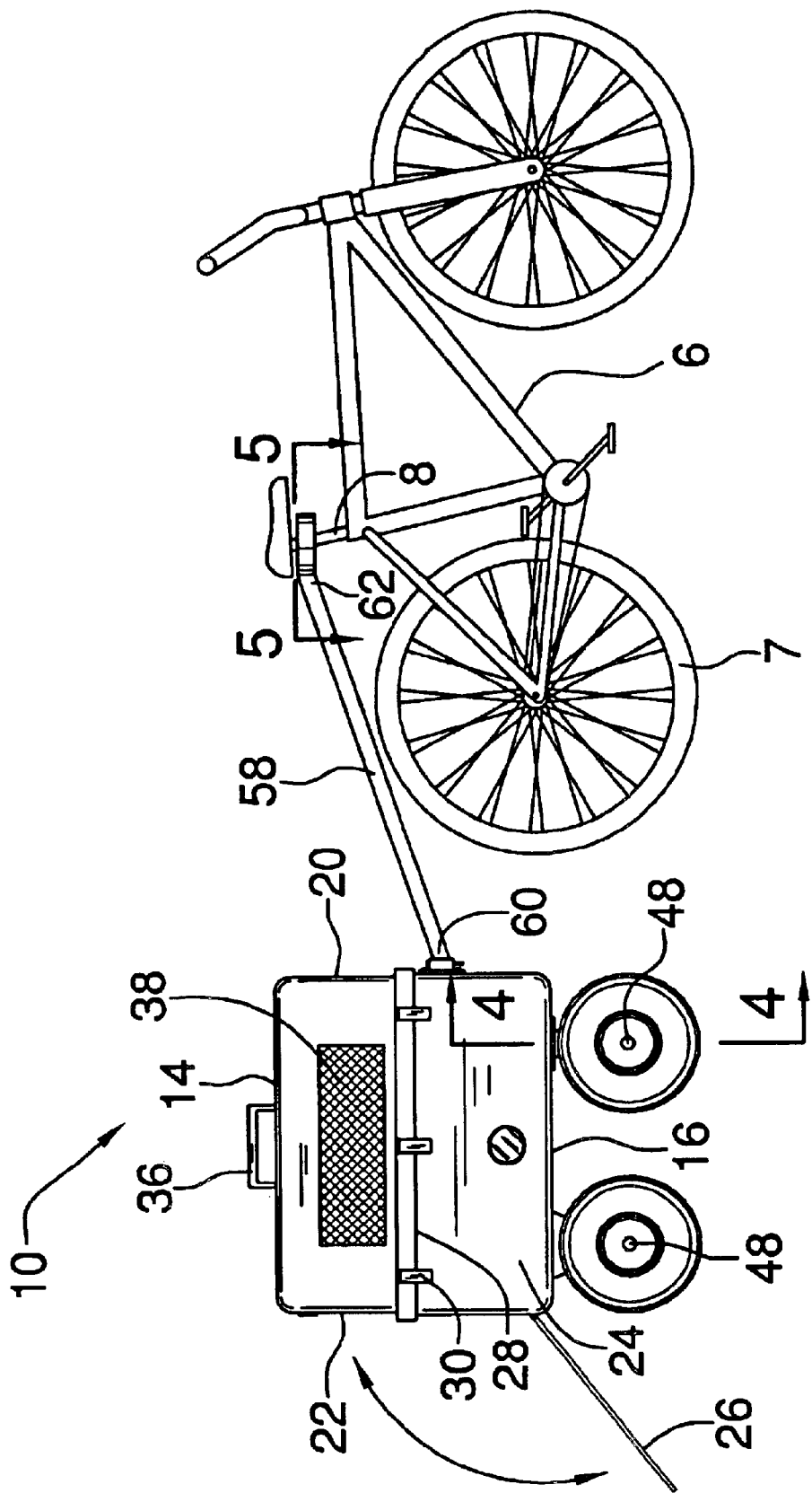
FIG. 1 is a schematic side view of a pet transporter for a bicycle according to the present invention.
Figure 2:
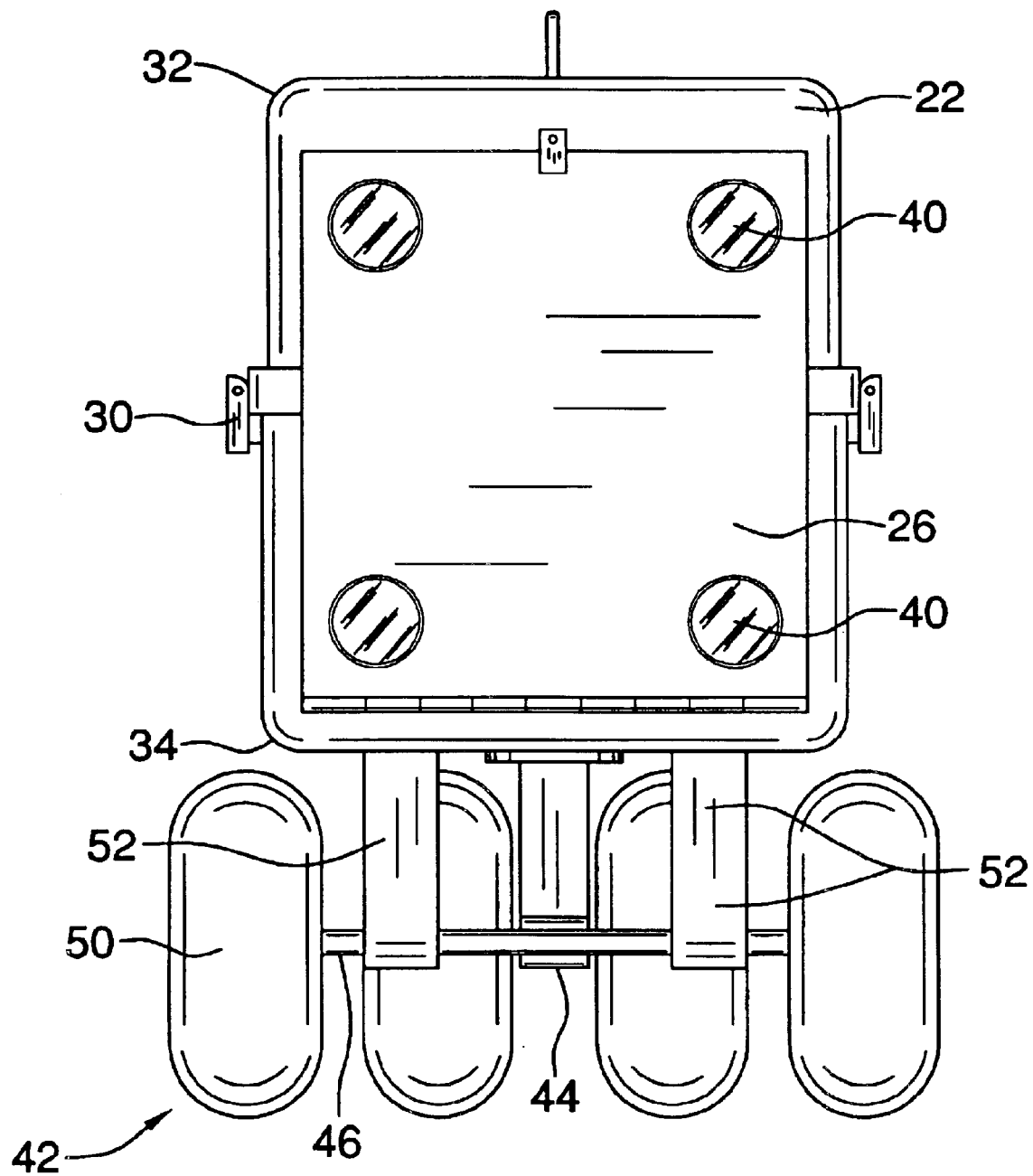
FIG. 2 is a schematic rear view of the present invention.
Figure 3:
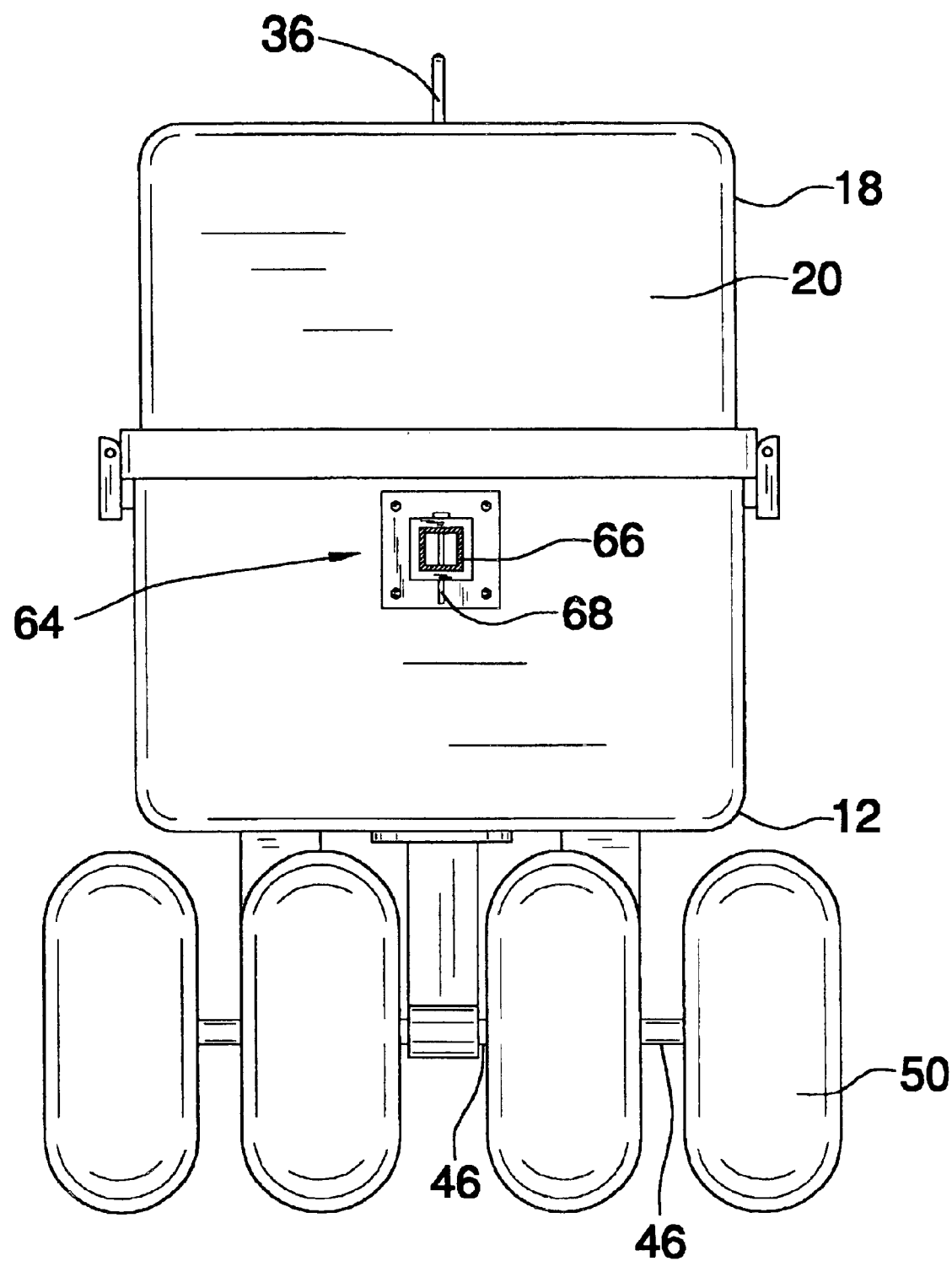
FIG. 3 is a schematic front view of the housing of the present invention.
Figure 4:
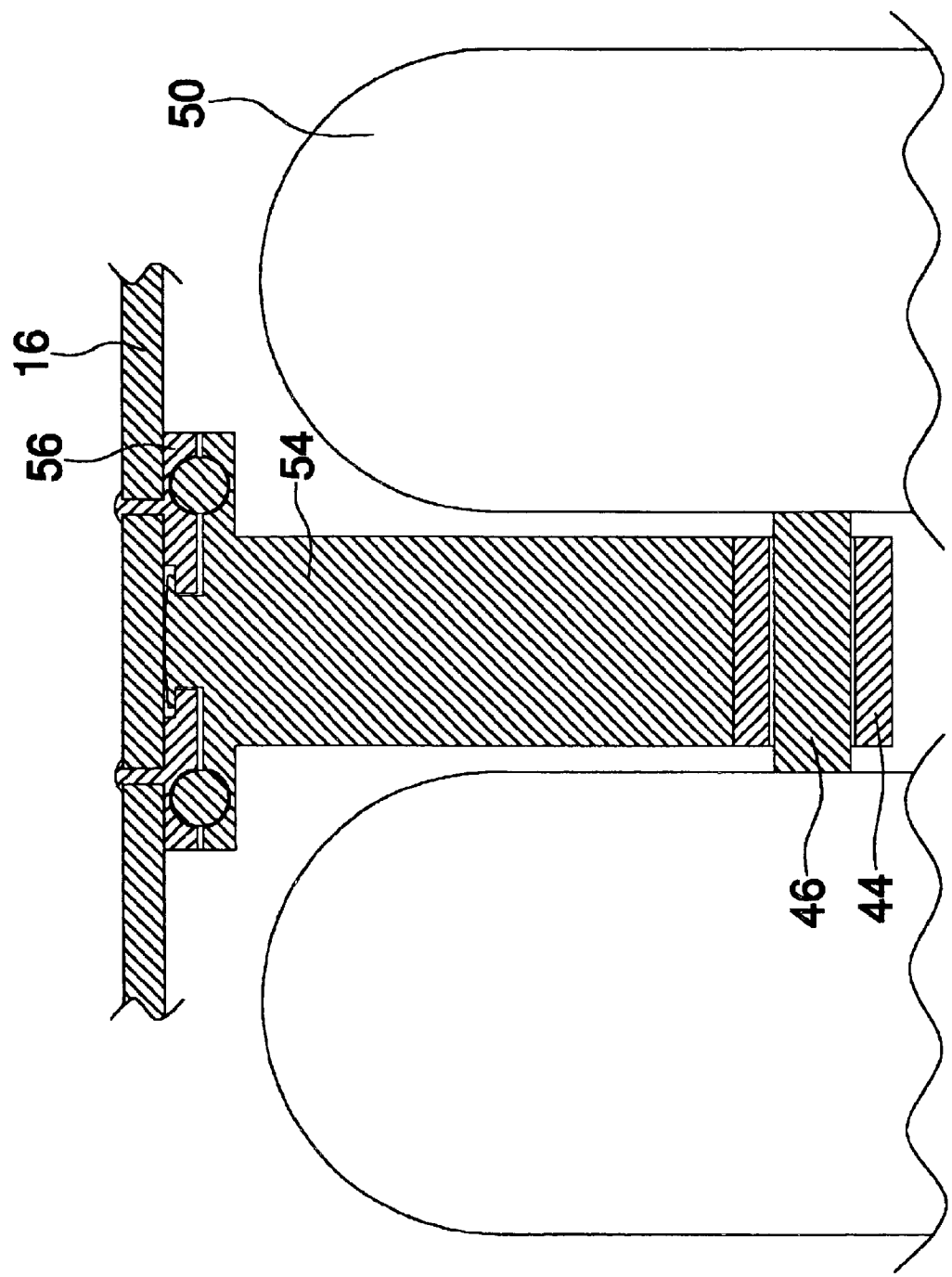
FIG. 4 is a schematic cross-sectional view taken along line 4—4 of FIG. 1 of the present invention.
Figure 5:
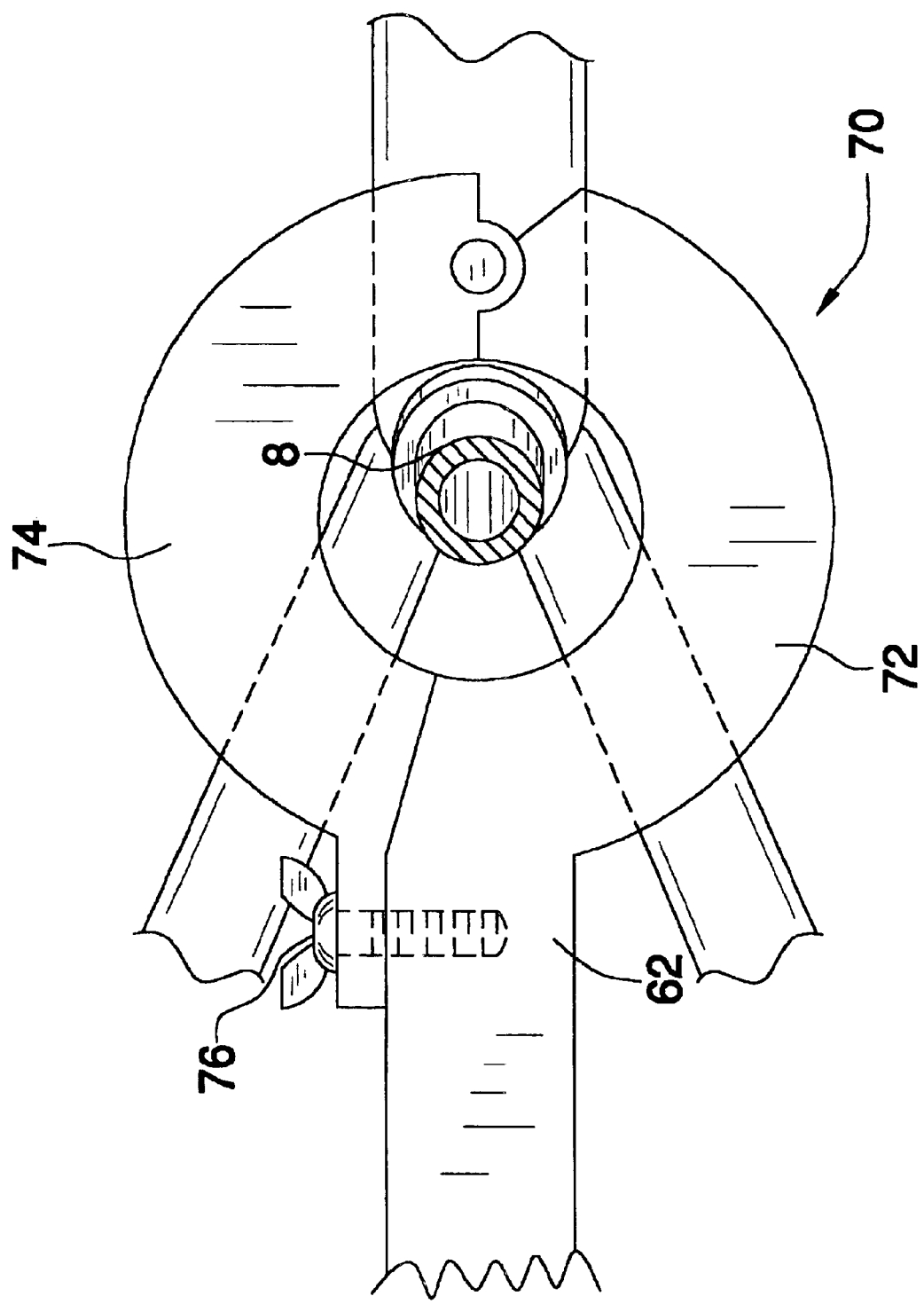
FIG. 5 is a schematic top view taken along line 5—5 of FIG. 1 of the present invention.

With reference now to the drawings, and in particular to FIGS. 1 through 5 thereof, a new pet transporter device embodying the principles and concepts of the present invention and generally designated by the reference numeral 10 will be described.

As best illustrated in FIGS. 1 through 5, the pet transporter 10 for a bicycle 6 generally comprises a housing 12 having a top wall 14, a bottom wall 16 and a peripheral wall 18 extending between and is attached to the top 14 and bottom 16 walls. The peripheral wall 18 includes a front wall 20, a back wall 22, and a pair of side walls 24. At least one door 26 is positioned in the peripheral wall 18 for selectively accessing an interior of the housing 12. The door 26 is positioned in the back wall 22. The housing 12 has a break 28 therein positioned between the top 14 and bottom 16 walls such that an upper portion 32 and a lower portion 34 of the housing 12 are defined. A plurality of clip members 30 is attached to the housing 12 for releasably securing the upper portion 32 to the lower portion 34. Having upper 32 and lower 34 portions allows for easy storage of the housing 12 as it can be taken apart and the first portion 32 positioned in the second portion 34. A handle 36 is attached to and extends upwardly from the top wall 14. The housing 12 preferably includes a plurality of air holes 38 or windows. Ideally, a plurality light reflectors 40 is attached to the back wall 22.

A wheel assembly 42 includes a central member 44. Each of a pair of axles 46 is attached to the central member 44 such that the axles 46 are orientated perpendicular to the central member 44 and the central member 44 substantially divides, or bisects, the axles 46. Each of the axles 46 has a pair of free ends 48. A plurality of wheels 50 is rotatably mounted on the axles 46 such that each of the axles 46 includes at least one wheel 50 positioned adjacent to each of the free ends 48.

A coupler assembly 52 releasably couples the wheel assembly 42 to the bottom wall 16 of the housing 12. The coupler assembly 52 includes a first mating section 54 is attached to and extends upwardly from the wheel assembly 42 and a second mating section 56 is attached to the bottom wall 16. The first mating section 54 is preferably a male coupler and the second mating section 56 is preferably a female coupler. Ideally, the pet transporter 10 includes three assemblies 52 spaced from each other.

An elongated member 58 has a first end 60 and a second end 62 and functions as a tow bar for the housing 12. A pivot member 64 releasably couples the first end 60 to the front wall 20 such that the first end 60 is pivotally coupled to the housing 12. The pivot member 64 includes a well 66 for receiving the first end 60 and pin 68 that is extendable through the well 66 and the elongated member 58. It is preferred that the elongated member 58 be removably attached to the housing 12 instead of the wheel assembly 42 to provide sufficient clearance between the elongated member 58 and the rear tire 7 of the bicycle 6.

A securing member 70 is attached to the second end 62 of the elongated member 58 for releasably coupling the second end 62 to a bicycle chair mount 8. The securing member 70 includes a ring that has a first portion 72 and a second portion 74. The first portion 72 is attached to the second end 62. The second portion 74 is hingedly coupled to the first portion 72 for positioning the ring around the mount 8. A fastener 76 releasably secures the second portion 74 to the first portion 72.

In use, the pet transporter 10 may be used as carrying device or kennel or it may be attached to the wheel assembly 42 and hitched to a bicycle 6 so that a bicycle may pull it. This allows for the easy transportation of a pet while the owner of the pet rides a bicycle.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A pet carrier device for transporting a pet behind bicycle, said device including:
   a housing having a top wall, a bottom wall and a peripheral wall extending between and being attached to said top and bottom walls, said peripheral wall including a front wall, a back wall, and a pair of side walls, at least one door being positioned in said peripheral wall for selectively accessing an interior of said housing;
   a wheel assembly including a central member, each of a pair of axles being attached to said central member such that said axles are orientated perpendicular to said central member and said central member substantially divides said axles, each of said axles having a pair of free ends, a plurality of wheels being rotatably mounted on said axles such that each of said axles includes at least one wheel positioned adjacent to each of said free ends;
   a coupler assembly releasably coupling said wheel assembly to said bottom wall of said housing;
   an elongated member having a first end and a second end, a pivot member releasably coupling said first end to said front wall such that said first end is pivotally coupled to said housing; and
   a securing member being attached to said second end of said elongated member for releasably coupling said second end to a bicycle chair mount.

2. The pet carrier device of claim 1, wherein said housing has a break therein positioned between said top and bottom walls such that an upper portion and a lower portion of said housing is defined, a plurality of clip members being attached to said housing for releasably securing said upper portion to said lower portion.

3. The pet carrier device of claim 1, further including a handle being attached to and extending upwardly from said top wall.

4. The pet carrier device of claim 1, wherein said coupler assembly includes a first mating section is attached to and extending upwardly from said wheel assembly and a second mating section being attached to said bottom wall.

5. The pet carrier device of claim 4, wherein said securing member includes a ring having a first portion and a second portion, said first portion being attached to said second end, said second portion being hingedly coupled to said first portion, a fastener releasably securing said second portion to said first portion.

6. The pet carrier device of claim 1, wherein said securing member includes a ring having a first portion and a second portion, said first portion being attached to said second end, said second portion being hingedly coupled to said first portion, a fastener releasably securing said second portion to said first portion.

7. A pet carrier device for transporting a pet behind bicycle, said device including:
   a housing having a top wall, a bottom wall and a peripheral wall extending between and being attached to said top and bottom walls, said peripheral wall including a front wall, a back wall, and a pair of side walls, at least one door being positioned in said peripheral wall for selectively accessing an interior of said housing, said door being positioned in said back wall, said housing having a break therein positioned between said top and bottom walls such that an upper portion and a lower portion of said housing is defined, a plurality of clip members being attached to said housing for releasably securing said upper portion to said lower portion;
   a handle being attached to and extending upwardly from said top wall;
   a wheel assembly including a central member, each of a pair of axles being attached to said central member such that said axles are orientated perpendicular to said central member and said central member substantially divides said axles, each of said axles having a pair of free ends, a plurality of wheels being rotatably mounted on said axles such that each of said axles includes at least one wheel positioned adjacent to each of said free ends;
   a coupler assembly releasably coupling said wheel assembly to said bottom wall of said housing, said coupler assembly including a first mating section being attached to and extending upwardly from said wheel assembly and a second mating section being attached to said bottom wall;
   an elongated member having a first end and a second end, a pivot member releasably coupling said first end to said front wall such that said first end is pivotally coupled to said housing; and
   a securing member being attached to said second end of said elongated member for releasably coupling said second end to a bicycle chair mount, said securing member including a ring having a first portion and a second portion, said first portion being attached to said second end, said second portion being hingedly coupled to said first portion, a fastener releasably securing said second portion to said first portion.

* * * * *